(12) United States Patent
Kiron et al.

(10) Patent No.: US 7,917,422 B2
(45) Date of Patent: Mar. 29, 2011

(54) OPEN END MUTUAL FUND SECURITIZATION PROCESS

(75) Inventors: Kenneth Kiron, New York, NY (US); Kevin S. Bander, Chicago, IL (US)

(73) Assignee: Leveraged Innovations LLC, New York, NY (US)

( * ) Notice: Subject to any disclaimer, the term of this patent is extended or adjusted under 35 U.S.C. 154(b) by 0 days.

(21) Appl. No.: 12/651,347

(22) Filed: Dec. 31, 2009

(65) Prior Publication Data

US 2010/0114797 A1 May 6, 2010

Related U.S. Application Data

(63) Continuation of application No. 09/839,888, filed on Apr. 20, 2001, now Pat. No. 7,698,192, which is a continuation of application No. 09/140,868, filed on Aug. 27, 1998, now Pat. No. 6,088,685, which is a continuation of application No. 08/542,431, filed on Oct. 12, 1995, now Pat. No. 5,806,048.

(51) Int. Cl.
G06Q 40/00 (2006.01)
(52) U.S. Cl. .................................. 705/36 R; 705/37
(58) Field of Classification Search .................. 705/37, 705/36 R
See application file for complete search history.

(56) References Cited

U.S. PATENT DOCUMENTS 5,214,579 A * 5/1993 Wolfberg et al. ........... 705/36 R
5,557,517 A * 9/1996 Daughterty, III ............... 705/37

* cited by examiner

*Primary Examiner* — Thu Thao Havan
(74) *Attorney, Agent, or Firm* — Bishop & Diehl, Ltd.

(57) ABSTRACT

A computer implemented system is provided for exchanging shares in an exchange traded product. A display is provided for displaying data representing shares of an exchange traded product comprising a leveraged portfolio of securities satisfying capitalization and performance criteria, the securities within the portfolio being weighted and having an expected future performance return greater than securities comprising a benchmark. The leveraged exchange traded product is configured for trading shares of the leveraged exchange traded product at a real time determined price related to the underlying price of each of the selected securities comprising the leveraged exchange traded product and related to the respective weightings of the selected securities. The exchange traded product can be open ended. An exchange computer is also provided for processing the exchange of the shares at a price related to the price of the securities within the leveraged portfolio, the exchange computer being configured to transmit data indicative of trades which occur intra-day over a communication network to an exchange clearing computer.

24 Claims, 3 Drawing Sheets

FIG. 1A

10 — GENERAL DATA PROCESSING COMPUTER SYSTEM: MEMORY STORAGE CONTAINS MASTER DATABASE OF OPEN END MUTUAL FUND STATISTICS PREFERRED SPECIFICATION OF COMPUTER: CDROM DRIVE, MONITOR HARD DRIVE CONTAINING 420 MEGABYTES 8 MEGABYTES RAM, 486 CPU

12 — ELIMINATE THOSE FUNDS IN MASTER DATABASE WHERE FUNDS ARE MARKED "NOT AVAILABLE FOR PURCHASE" PUT REMAINING FUNDS IN NEW DATABASE: "DATABASE #1"

14 — ELIMINATE ALL FUNDS IN DATABASE #1 WHERE ASSET SIZE IS NOT EQUAL TO "USER DEFINED" STORING REMAINING FUNDS IN NEW DATABASE: "DATABASE #2"

16 — SEARCH DATABASE "DATABASE #2" FOR THOSE FUNDS WHERE CATEGORY OF INVESTMENT STYLE = "USER DEFINED" AND PLACE IN NEW DATABASE: "DATABASE #3"

18 — SEARCH DATABASE #3; SELECT THOSE FUNDS WHERE RETURN OVER TIME (T) > AVERAGE OF ALL FUNDS IN DATABASE #3 WHERE TIME (T) = "USER DEFINED" AND STORE IN NEW DATABASE NAMED: "DATABASE #4"

20 — SEARCH DATABASE #3 AND SELECT FUNDS WHERE RISK OVER TIME (T) < AVERAGE OF ALL FUNDS IN DATABASE #3 WHERE TIME (T) = "USER DEFINED" AND RISK = "USER DEFINED". STORE SELECTED FUNDS IN NEW DATABASE NAMED: "DATABASE #5"

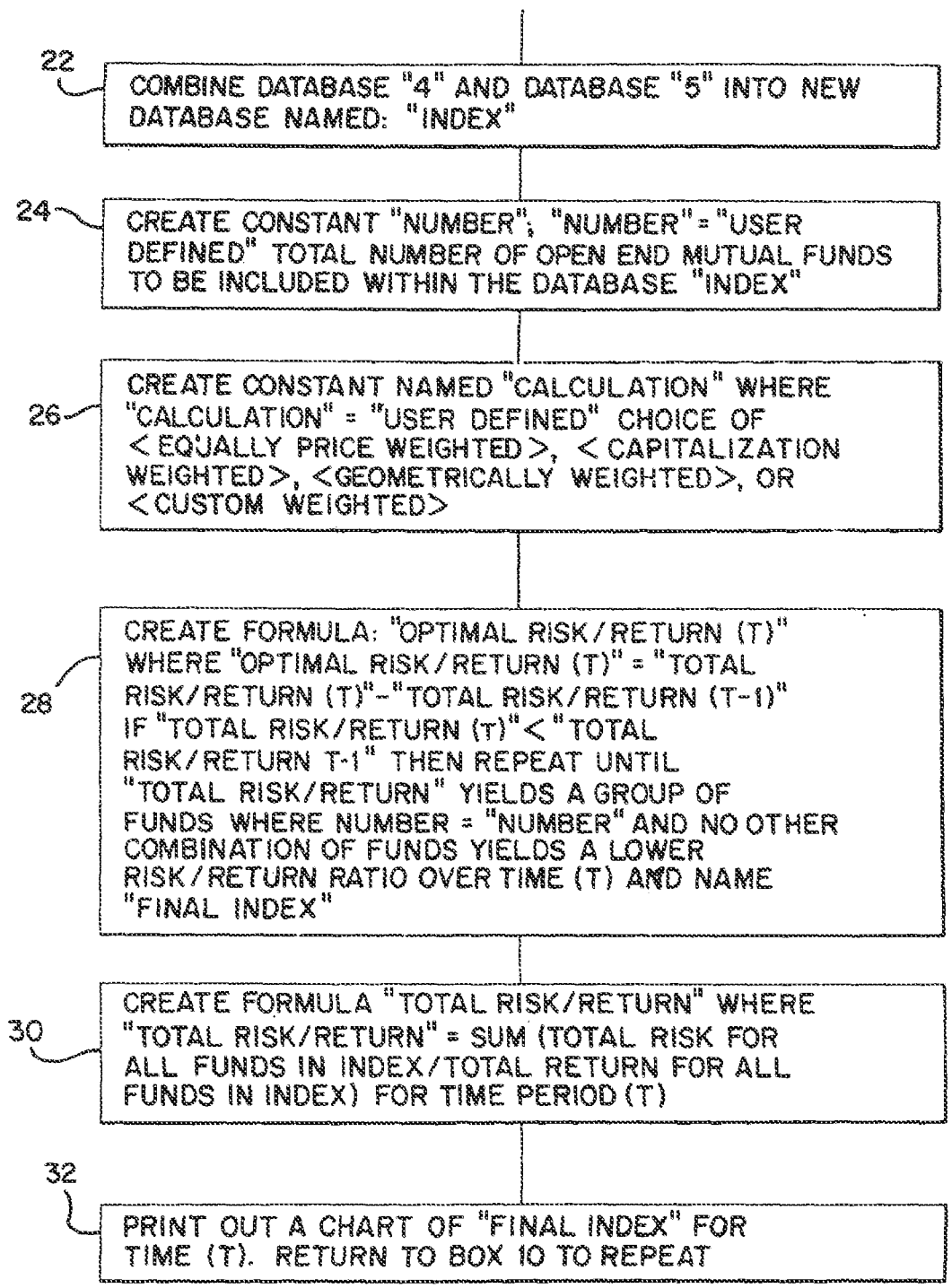

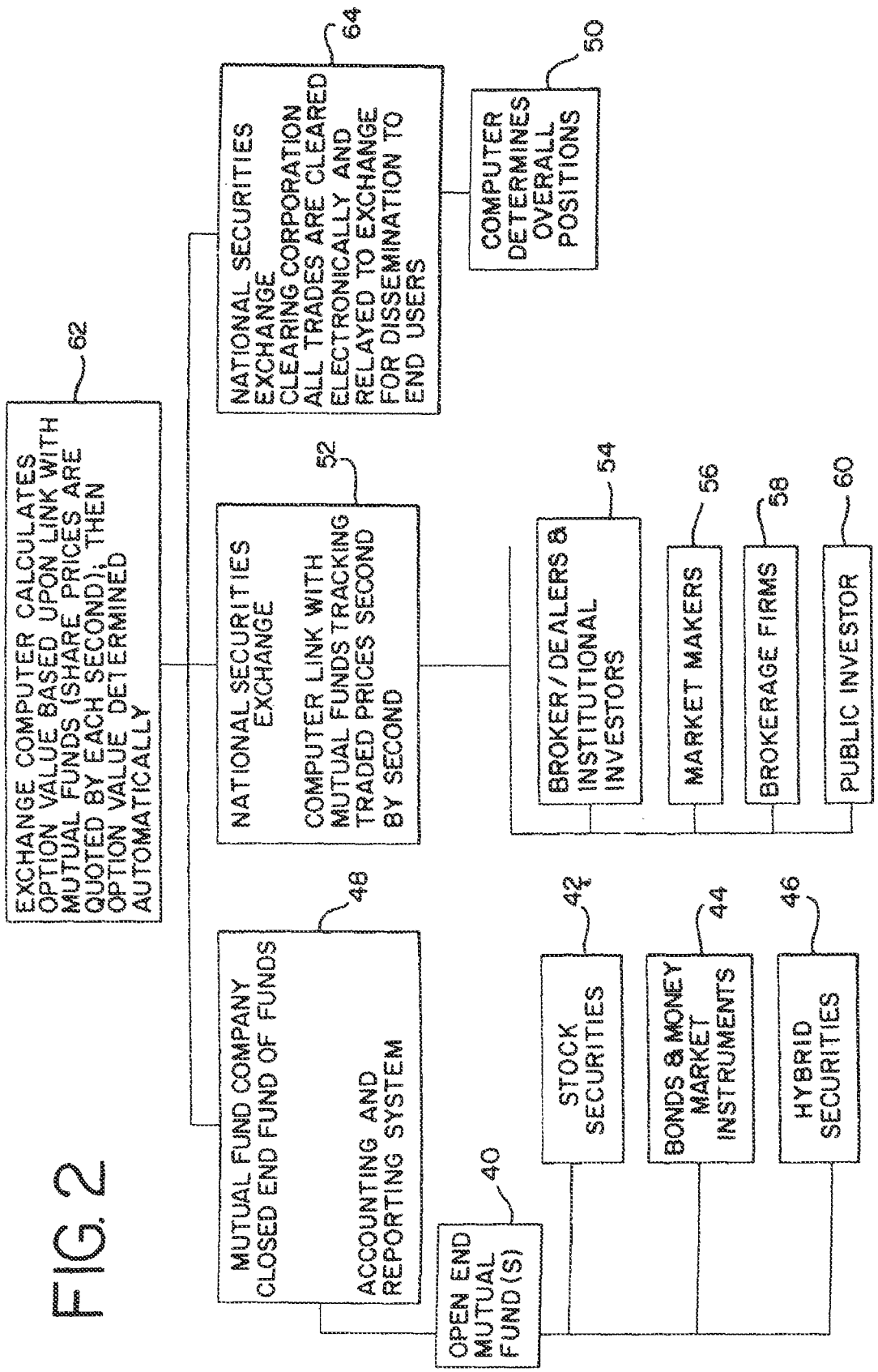

OPEN END MUTUAL FUND SECURITIZATION PROCESS

CROSS REFERENCE TO RELATED APPLICATIONS

The present application is a continuation application of U.S. patent application Ser. No. 09/839,888, filed on Apr. 20, 2001, entitled "Open End Mutual Fund Securitization Process" which is a continuation application of U.S. patent application Ser. No. 09/579,801, filed on May 26, 2000, entitled "Open End Mutual Fund Securitization Process" which is a continuation application of U.S. patent application Ser. No. 09/140,868, filed on Aug. 27, 1998, now issued as U.S. Pat. No. 6,088,685 and entitled "Open End Mutual Fund Securitization Process," which is a continuation application of U.S. patent application Ser. No. 08/542,431, filed on Oct. 12, 1995, now issued as U.S. Pat. No. 5,806,048 and entitled "Open End Mutual Fund Securitization Process," the contents of which are expressly incorporated herein by reference.

This application relates to a new financial process which securitizes open end mutual funds to facilitate intra-day trading of the funds and linked derivative securities.

BACKGROUND OF THE INVENTION

There are currently over 7,000 open end mutual funds registered with the Securities and Exchange Commission. None of these open end mutual funds, or any index of open end mutual funds, or any linked derivative, are traded on a National Securities Exchange. The reason for this phenomenon lies in the way that open end mutual funds sell their shares, and subsequently buy back their shares from the public.

Open end funds are required by law to sell their shares at the net asset value (N.A.V.), which represents the total assets owned by the fund, less the total liabilities, divided by the number of shares outstanding, plus a sales charge (also known as a sales load). When buying back their shares, open end funds must, by law, buy back their shares at their fund's N.A.V.

Many mutual funds make hundreds (if not thousands) of trades during the day, purchasing and selling a wide range of financial securities, some of which are difficult to value. Thus, it is time consuming, tedious, expensive and otherwise difficult to determine an exact N.A.V. during the day. Consequently, over 99% of all open end funds allow investors to purchase and sell their funds only at the end of the day. The remaining 1% of open end funds, commonly known as sector funds, calculate their N.A.V. every hour, allowing a more frequent ability to buy or sell their shares. In either case, however, the investor does not know what price will be paid for the open end fund shares until after the order has been placed, and the fund has calculated its N.A.V.

Recently, mutual fund portfolio managers have developed a new type of mutual fund called an open end fund of funds. A fund of funds is an open end fund that invests in other open end mutual funds. But like all the other open end funds created in the past, they can only be bought and sold at the end of the day.

Another new product developed is called the SPDR™, which is short for Standard and Poors Depository Receipt. This security, which is traded on the American Stock Exchange, represents a fractional share of a basket of stocks known as the Standard and Poors 500 index (S&P500). While many mutual funds invest in the S&P500, the SPDR is not a mutual fund; it is a basket of stocks set up as unit investment trust, where the total amount of shares outstanding within the trust fluctuates daily.

In 1992, a large investment banking house created and became the market maker for a basket of stocks which attempted to replicate the performance of a few select open end sector funds, a basket that was traded intra-day on the Over the Counter Market (OTC). Unfortunately, because the net asset value of the open end sector funds was unknown during the 59 minutes of each hour that the basket was traded, the spread between the price that the firm was willing to buy the funds and sell the funds for was large. Further, the correlation between the performance of the basket of stocks to the performance of the open end sector funds was neither reliable nor consistent. This problem existed because the open end fund managers were constantly buying and selling securities during the day, and the investment banking house did not know exactly which securities the open end funds held.

Another recent development within the mutual fund industry is a service that allows investors to buy and sell open end funds during the day. The Jack White & Co., a regional brokerage firm, maintains a screen-based computer system which provides a private market place for investors to buy and sell a small number (less than six percent) of all open end mutual funds at a price other than net asset value, provided buyer and seller can agree on a price. This service has failed to generate significant trading volume, however, because only the public can buy or sell fund shares. Institutional investors, pension funds, portfolio managers, and other professional investors, which traditionally represent 70 to 80% of trading volume, are prevented by law from buying or selling open end mutual funds at a price other than N.A.V. The Jack White program also allows short selling, but shares must be "found," which can take days, weeks, or months to complete the transaction. As a result of these restrictions, it is very difficult, if not impossible, for either the public or the professional investor to purchase or sell open end mutual funds during the day.

Because of the lack of liquidity and the legal obstacles involved in trading open end funds at prices other than N.A.V., up to now, those skilled in developing new products for stock exchanges thought that there was no workable way to trade open end funds, an index of open end funds, or linked derivative securities. The obstacles appeared insolvable.

All of the open end funds and products presently available suffer a number of disadvantages:

A) Open end funds cannot sell or buy back their shares at a price other than N.A.V. (plus sales load, if any).
B) Open end funds are unable to let their customers know what price they will receive when they place their order.
C) Open end funds are not traded on an exchange so investors cannot leverage their investments through the trading of derivative securities.
D) Open end funds do not allow investors to place orders including: good 'til cancelled (GTC), open, market, limit, stop loss, or stop limit, which would allow an investor to purchase or sell shares at a specific price or time.
E) Open end funds impose fees for purchases and sales of their shares if they occur frequently.
F) Open end funds impose fees for investors who do not own minimum amount of shares.
G) Open end shares cannot be easily sold short. Shares must be found, which could take days, weeks or even years.
H) All shares of open end mutual funds and unit investment trusts theoretically could be redeemed in one day, meaning a fund may have its assets drop to zero at any time.

I) Open end fund shares cannot be sold or purchased except through written notification, which may take several days to mail or process.

SUMMARY OF THE INVENTION

The present invention's open end fund securitization process will allow for the first time: (a) intra-day trading of an unlimited number of mutual fund indexes comprised of open end funds; (b) intra-day trading of an unlimited number of open end mutual funds with a greater degree of liquidity; and (c) intra-day trading of derivative securities linked to open end funds and indexes of open end funds.

This process is made possible by the creation of a second type of security, which will invest substantially all of its assets in the targeted open end mutual fund shares. The preferred embodiment for this new security is a "closed end fund of funds", which has a fixed number of shares outstanding, and a constant portfolio which is invested exclusively in the shares of the targeted open end fund(s). The result is a new security which will synthetically replicate the performance of those shares purchased, and do so with a high degree of correlation and consistency. This new security can then be listed on a National Securities Exchange and traded without restriction. After trading begins, linked derivative securities can then be listed and traded.

Other objects and advantages of the present invention include:

A) Any open end fund, when securitized, can be listed on a stock exchange and traded at any second, minute or hour, regardless of the open end fund N.A.V.
B) Investors can determine what price will be paid before an order is placed.
C) A National Securities Exchange (N.S.E.) will be able to list derivatives on the securitized open end funds, because of the greater price transparency generated through the trading of the securitized open end funds. The invention will act as a hedge for market makers who wish to lay off their risk of making markets in options on the underlying security.
D) Investors will be able to leverage their investments.
E) Investors will be able to place GTC, open, stop loss, market, limit orders when buying or selling their funds.
F) Investors can buy or sell the securitized funds as often as they wish with no penalty.
G) Investors will be able to purchase or sell their shares immediately by making a phone call to their broker, or by electronic trading.
H) Investors will not be charged arbitrary fees for frequent purchases or selling of the securitized open end funds.
I) Investors will not be charged additional fees for owning small quantities of shares.
J) The securitized funds have fixed number of shares which provides stability of asset levels.
K) Investors will be able to sell shares short quicker, and with greater liquidity.
L) Open end fund management will benefit from reduced volatility in their cash levels and in their frequently traded customer account assets, resulting in lower fund expense ratios.
M) Investors purchasing a securitized fund will pay a reduced sales load in many cases than they would otherwise have to pay because of the bulk purchasing power the securitized fund will have when investing in specific open end funds.

Further objects and advantages include the ability to trade a futures contract on both a securitized fund share and an index of securitized fund shares with linked derivative securities. In addition, the present invention solves a long existing but unsolved and unrecognized need. Many investors, both professional and non-professional own multiple mutual funds in an effort to diversify their investment portfolio's. An index of open end mutual funds would allow greater diversification, lower transaction costs, expanded investment choices and the ability to measure their fund performance against a relevant benchmark index. The index could be calculated many different ways with a great deal of flexibility: equal price weighted, capitalization weighted, or geometrically weighted, depending upon the need. Still further objects and advantages will become apparent from a consideration of the ensuing description and drawings.

BRIEF DESCRIPTION OF DRAWINGS

The present invention will be more fully understood by reference to the following detailed description thereof when read in conjunction with the attached drawings, and wherein:

FIGS. 1A and 1B represent how an open-end mutual fund index is created in a general data processing computer. These figures represent computer requirements and also comprise a schematic flowchart of process operating therewithin.

FIG. 2 illustrates how the preferred embodiment of an open-end mutual fund index is synthetically replicated through the creation of a new security. The preferred embodiment for this new security is a "closed end fund" and linked derivative securities.

DETAILED DESCRIPTION OF DRAWINGS

Referring to FIG. 1A, the box designated 10 represents an electronic database (a "master database") of extensive statistical information stored in a computer containing the entire universe of open end mutual fund statistics in existence registered in the defined country or geographic area. The preferred embodiment database includes extensive statistics for each open end fund. This information includes fund net asset value (N.A.V.) for each year, portfolio composition, investment objective, load adjusted and unadjusted return, maximum sales charge, median market capitalization, daily, monthly, quarterly, yearly, multi-year returns, mpt, beta, sharpe, R squared, standard deviation, historical risk/reward ratios, N.A.V. distribution adjusted earning, payout ratio, potential capital gains exposure, price/book ratio, price/earnings ratio, prospectus, purchase constraints, redemption fees, sector weighting, shareholder fees, total return, total return percentile, turnover ratio, deferred fees, debt % total capitalization, dividends, distributor, telephone number, manager name, manager tenure, class of shares, and brokerage availability. It will be understood that not all of this information is required to practice the claimed invention.

As also reflected in box 10, the computer itself has a preferred specification of at least 420 megabytes of internal memory (hard drive), eight megabytes of RAM (random access memory), a CD ROM player operating at 4× speed (at least), a Pentium CPU, VGA monitor, and a keyboard.

The box designated 12 represents a computer program algorithm or step that eliminates those funds not available for purchase and puts these funds into a new database where these funds are stored in memory. This function acts as a filter eliminating from the search all open end mutual funds that are not available for purchase. The algorithm creates a new memory storage area containing those funds that fit within the criteria and stores those funds within a new section of the computer memory. This new memory location can be accessed by its new name: DATABASE #1. The history of open end mutual funds makes this algorithm very important. Because funds frequently close their doors to new money (as their popularity increases), keeping track of which funds can be purchased at the initial screening stage reduces the waste of memory that would occur by repeatedly saving large amounts of information redundantly to the hard drive.

The box designated 14 represents the step where a minimum asset size of the fund is selected; the time period(s) through which statistics will be retrieved (time t) is chosen and the computer is directed to create a new database where these funds are stored in memory. There are hundreds of funds that have assets of less than $5,000,000. The ability to buy and eventually sell a large amount of shares in a thinly capitalized fund could be problematic. In addition, the smaller funds tend to be the most volatile and tend to have shorter track records to measure their past performance. The minimum asset size selection will direct the computer to select only those funds that have a pre-selected asset level, mitigating some of these potential problems.

The time period (t) for which statistics will be chosen is very important. More so than many other types of security, an open end mutual fund is "ranked" for its performance based upon how well it does over specific time periods. The ability to segregate fund statistics information over various time horizons provide a unique tool to evaluate a funds performance.

The box designated 16 represents a computer program algorithm which separates the group of funds stored in a database created by the step set forth in box 14. This new group of funds is stored in a new memory location defined by its specific investment criteria. This criteria may include a subgroup including the fund investment objective or the sector weightings of its portfolio. Currently, the major fund investment objective subgroups include Aggressive Growth, Growth and Income, Growth, Income, Bond, Sector, Asset Allocation, Specialty, Equity Income, Europe Stock, Foreign Stock, Government Bond, Hybrid Income, Small Company, World Stock and World Bond.

The box designated 18 represents a computer program algorithm which searches and identifies all the funds where the statistical performance is greater than the aggregate subgroup over time periods (t) and puts these funds into a new database where these funds are stored in a new memory location. The performance of a fund can be measured in many ways. It could be based upon total return, load adjusted return, unadjusted load return, or a return with dividends reinvested. Once the specified performance criteria have been selected, the computer can average all of the funds in that subgroup before retrieving those funds that have above average returns. All funds, for example, that have returns better than 50% of the funds in the universe would be selected as being above the "average" subgroup return. These funds would then be stored in a new memory location, to be analyzed at a later time.

The box designated 20 represents an algorithm where the computer searches and retrieves all funds where the risk is smaller than the aggregate subgroup over time periods (t) and stores these funds in a new database. Funds, for example that have a smaller risk profile than 50% (the exact average) of the funds in the subgroup would be selected as beating the "average" subgroup return. These funds would then be stored in a new memory location, to be analyzed at a later time.

Referring to FIG. 1B, the box designated 22 represents an algorithm where the computer combines the funds identified by the steps taken as set forth in boxes 18 and 20 to create a new group of open end mutual funds that have the lowest combined risk to return ratio over time periods (t) and puts these funds into a new database where the information on these funds is stored in a new memory location. Generally, this type of function is called a Relationship Search routine because it allows for linking together user defined criteria to produce one result. It is a very powerful tool for linking large amounts of information together.

The box designated 24 represents a step where the number of funds that the index will contain is chosen. This number could range from 1 to the number of funds in the database. Depending upon the investment objective or how much money is available to invest in the index, this number will fluctuate.

The box designated 26 represents the step where the index calculation method is selected. An index generally is calculated one of three ways; "Equally Priced", meaning all of the price are added up and divided by the total number of securities; "Capitalization Weighted", which is based upon the amount of price of the security times the number of shares outstanding; or "Geometrically Weighted", which involves a more complicated averaging of share prices. The index value can dramatically shift depending upon what weighting is used.

The box designated 28 represents a step that uses a formula which sequentially analyzes each risk/reward ratio of each permutation of funds selected by the computer in step represented in the box designated 30.

Box 30 is an algorithm wherein the general data processor eliminates the large risk/reward combinations found in "database index" using the formula determined by box 28, and sequentially stores in memory the smallest risk/reward combinations, stopping only when the smallest risk/reward ratio is found. This results in the selection of the final index. When all of the funds with superior returns have been identified and stored, and all the funds with lower than average risk have been identified and stored, the computer can then match up all of the different combinations of funds to determine which group contains the optimally lowest risk/highest return ratio. This ratio can be calculated over multiple time period to provide for example, the lowest ratio over 1, 3, 5, and 10 years. In the final group of funds, the number selected by the user pursuant to the step of box 24 will determine how many funds the index ultimately will contain.

The box designated 32 represents the step of displaying a graph of the combined funds over time periods (t), showing their combined statistical performance based upon the calculation method selected set forth in box 26. The computer is instructed to return to box 10 so the program may repeat itself.

Referring to FIG. 2, the box designated 40 represents the group of open end mutual funds selected pursuant to the steps set forth in FIGS. 1A and 1B. These funds own financial securities including stock securities (box 42), bonds and money market instruments (box 44) and or hybrid, illiquid securities (box 46). The N.A.V. is calculated by the open end funds at the end of the day and disseminated to the closed end fund of funds.

The box designated 48 represents the closed end fund of funds which synthetically replicates the performance of those open end funds contained within box 40. By investing all available assets in box 40, the closed end fund of funds statistical performance correlates strongly and consistently with the open end funds located in box 40. A computerized accounting and reporting system, located within the closed end fund of funds, receives overall position reports of changes in fund share ownership through an electronic data link with an exchange clearing computer represented by box 50. Box 48 is the National Securities Exchange ("N.S.E.") clearing computer electronically calculating the overall positions of shareholders at the end of the day and then transferring all shareholder information to the closed end fund. Upon receipt of this information, the accounting and reporting system generates information regarding tax liabilities, financial reports and other relevant documentation to shareholders, government agencies and other relevant parties.

Box 52 represents an electronic data link between the N.S.E. computer and the closed end fund of funds. The closed end fund of funds calculates its net asset value and disseminates that information to the N.S.E. on a daily basis. The N.S.E. then publishes that information to market participants including broker/dealers and institutional investors (box 54), market makers (box 56), brokerage firms (box 58) and public investors (box 60) who then buy and sell the synthetic fund shares intra-day at any mutually agreed upon price (which is used by market participants to derive the price of linked derivative securities). Linked derivative security valuations on the closed end fund of funds are generated, as represented by box 62, the valuation of which is based upon the market prices generated through real-time trading of the relevant closed end fund of funds by market participants located in box 54, box 56, box 58, and box 60. Box 62 is the N.S.E. computer calculating an index of various closed end fund of funds traded.

Box 64 represents the electronic data link between the N.S.E. clearing computer, which keeps track of the exchange trades that occur during the day, and the closed end synthetic fund.

While the inventors believe that an index of open end mutual funds comprised of those funds that have the largest return on investment and the lowest risk combination may outperform those funds that, in contrast, have demonstrated lower returns and higher risk, it must be noted that past performance does not guarantee similar performance in the future.

Thus, the reader will see that the index of mutual funds described herein provides a means for identifying superior historical performance within each subgroup obtainable through a screening process which minimizes the selection of high risk/low return open end mutual funds and maximizes the selection of those funds with low risk/high return statistical data. The hope is that by identifying and investing within an index of funds that have demonstrated superior risk/return ratios within a particular sector, these funds will continue to produce superior returns with low risk in the future than their peers.

The creation of a separate security, the preferred embodiment being a "closed end fund of funds", provides the means for investing intra-day in the desired open end funds, and enables market participants to derive a real-time valuation for linked derivative securities.

While the above description contains many specific examples, these should not be construed as limitations on the scope of the invention, but rather as an exemplification of one preferred embodiment thereof. Many variations are possible. For example, instead of creating a closed end fund of funds, a unit investment trust could be created to replicate the performance of an open end fund or group of funds. While this security could have large swings in its capitalization level, it nevertheless may be able to replicate the performance of an open end fund or group of funds, and act as a hedge for listed derivative securities.

In addition, an index could be created based upon such strict requirements that the index would be limited to just one fund. Another index variation might be one that selects only those funds that beat an external index such as the S&P500 or Dow Jones Industrial Average. In addition, an index of securitized funds, as well as linked derivative securities including puts and calls, futures, caps and floors, total return swaps, collars, warrants, equity swaps, swaptions, knock-out options and variation thereof could be traded through the Over the Counter Market, which is located off the exchange floor. Accordingly, the scope of the invention should be determined not by the embodiments illustrated, but by the appended claims and their legal equivalents.

What is claimed is:

1. A computer implemented system for exchanging shares in an exchange traded product, the system comprising:
    a display for displaying data representing shares of an exchange traded product comprising a leveraged portfolio of securities satisfying capitalization and performance criteria, the securities within the portfolio being weighted and having an expected future performance return greater than securities comprising a benchmark;
    wherein the leveraged exchange traded product is configured for trading shares of the leveraged exchange traded product at a real time determined price related to the underlying price of each of the selected securities comprising the leveraged exchange traded product and related to the respective weightings of the selected securities, and wherein the exchange traded product is open ended; and
    an exchange computer for processing the exchange of the shares at a price related to the price of the securities within the leveraged portfolio, the exchange computer configured to transmit data indicative of trades which occur intra-day over a communication network to an exchange clearing computer.

2. The computer implemented system of claim 1 wherein the leveraged exchange traded product is a trust.

3. The computer implemented system of claim 1 where in the leveraged exchange traded product is a fund.

4. The computer implemented system of claim 1 wherein the leveraged exchange traded product is not a fund.

5. The computer implemented system of claim 1 wherein the portfolio is displayed in humanly readable form over a defined period of time.

6. The computer implemented system of claim 1 wherein the portfolio is not displayed in humanly readable form over a defined period of time.

7. The computer implemented system of claim 1 wherein the capitalization criteria is satisfied at least in part by debt.

8. The computer implemented system of claim 1 wherein the exchange traded product provides a return greater than a group of one or more securities comprising a benchmark on at least one of a daily, monthly, quarterly, yearly, or multi-year basis.

9. The computer implemented system of claim 8 wherein the benchmark is an index.

10. The computer implemented system of claim 8 wherein the benchmark is not an index.

11. The computer implemented system of claim 9 wherein the index is comprised of equities.

12. The computer implemented system of claim 11 wherein the index is comprised of one or more securities.

13. The computer implemented system of claim 9 wherein the index is not comprised of equities.

14. The computer implemented system of claim 13 wherein the index is comprised of one or more securities.

15. The computer implemented system of claim 8 wherein the beta of the leveraged portfolio is at least 50% greater than the beta of one or more securities comprising the benchmark.

16. The computer implemented system of claim 1 wherein the exchange traded product further comprises at least one product selected from the group consisting of puts and calls, futures, caps and floors, total return swaps, collars, warrants, equity swaps, options and knock-out options.

17. The computer implemented system of claim 1 wherein the leveraged exchange traded product has a class of shares.

18. The computer implemented system of claim 1 wherein the leveraged exchange traded computer is further configured to list derivatives available for purchase or sale, the derivatives having price related to the real-time determined price of the leveraged exchange traded product.

19. The computer implemented system of claim 1 wherein the exchange computer is configured to facilitate electronic trading of the shares of the leveraged exchange traded product.

20. The computer implemented system of claim 1 wherein the leveraged exchange traded product is configured to facilitate buying and selling of the shares of the leveraged exchange traded product at a mutually agreed upon price.

21. The computer implemented system of claim 1 wherein the display also displays a hedge that can be bought or sold for a price related to the price of the shares of the leveraged exchange traded product.

22. The computer implemented system of claim 1 further comprising a processor for correlating the price of the shares to the price of the securities within the leveraged exchange traded portfolio.

23. The computer implemented system of claim 1 wherein the leveraged portfolio comprises only one security.

24. The computer implemented system of claim 1 wherein the benchmark comprises only one security.

* * * * *